March 16, 1954  V. D. LANDON  2,672,576
APPARATUS FOR GENERATING ROTATING MAGNETIC FIELDS
Filed Oct. 11, 1951
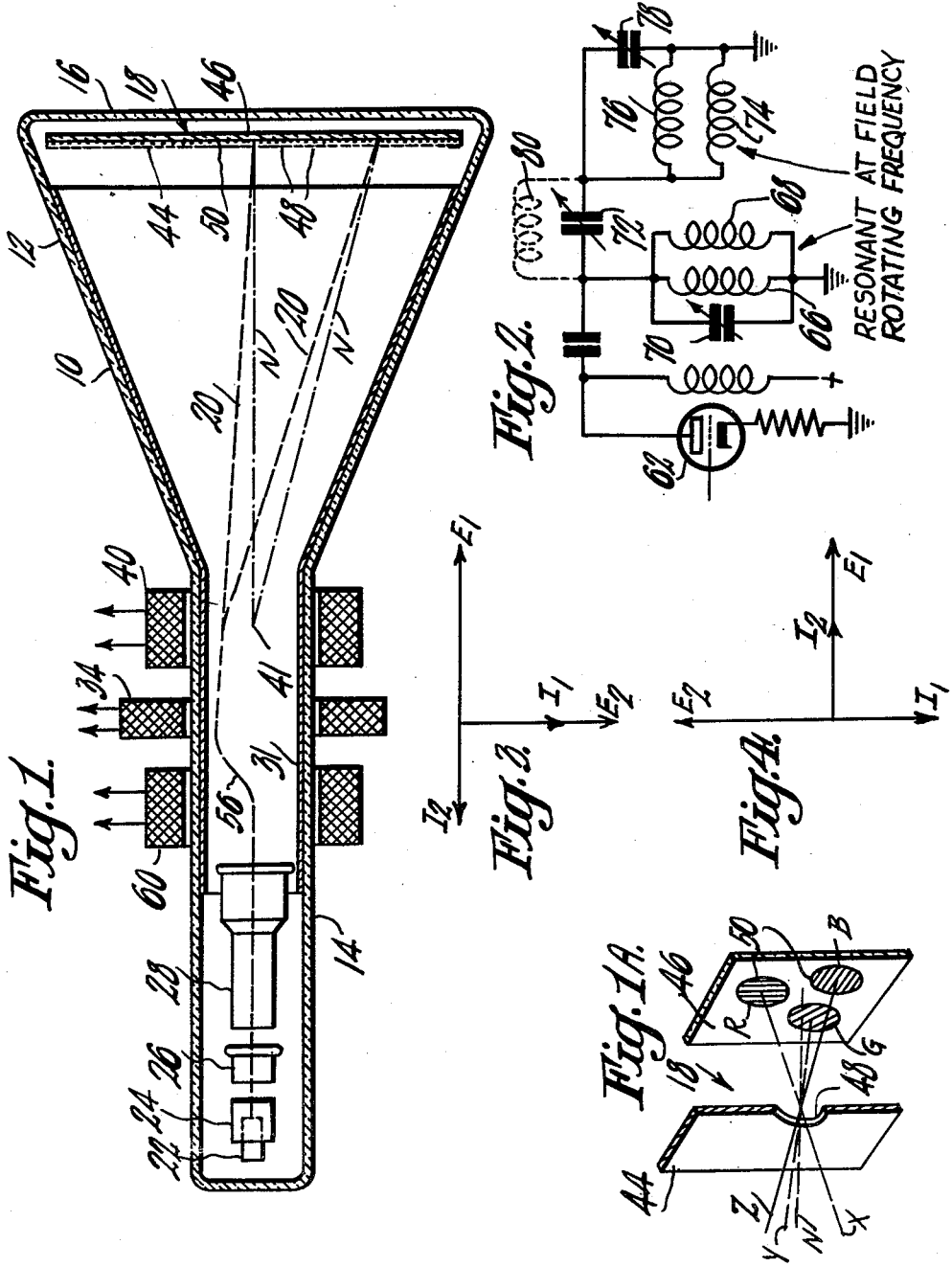
INVENTOR
Vernon D. Landon
ATTORNEY Patented Mar. 16, 1954

2,672,576

UNITED STATES PATENT OFFICE 2,672,576

APPARATUS FOR GENERATING ROTATING MAGNETIC FIELDS

Vernon D. Landon, Princeton, N. J., assignor to Radio Corporation of America, a corporation of Delaware Application October 11, 1951, Serial No. 250,841

6 Claims. (Cl. 315—24)

The present invention relates to apparatus for generating a rotating magnetic field for use in certain types of cathode ray tubes.

This invention is useful in a cathode ray tube employing a circular or elliptical scan such as in certain radar apparatus. It is especially adapted to use in the type of single beam color kinescope described below where the speed of rotation of the magnetic field is in the order of megacycles. In most kinescopes, the electrons start at the principle axis of the tube and after deflection follow a substantially straight line to the target.

A kinescope for reproducing images in color in response to electrical signals has been devised in which the beam of electrons rotates about the path it would follow to the target in the normal kinescope. This rotation is effected by a rotating magnetic field which bends the beam of electrons radially away from the normal path. However, the beam is focussed so that it strikes the same spot as a normal beam. Hence the beam can be thought of as generating a surface of revolution of nearly conical shape having its apex scanning the target. The rotation of the beam thus causes the electrons of the beam to approach the target from constantly varying directions in addition to any change in direction resulting from the scanning action. The target is constructed so that the primary color emitted in response to the beam of electrons depends on the direction of approach of the beam with respect to the path that would be followed in a normal kinescope wherein the beam is not rotated. The changes in direction due to the beam scansion alone do not produce any changes in color. The colors are reproduced in a given sequence as the beam rotates.

Heretofore the rotating magnetic field has been established by supplying two pairs of coils mounted with their axes at 90° with each other with currents that are 90° out of phase. The 90° phase difference between currents has been effected in a variety of ways by use of external circuits. Furthermore, if it is desired to change the direction of rotation of the magnetic field, some additional switching arrangement has been provided to interchange the phase of the voltages applied to the pairs of coils.

It is the object of the present invention to provide improved means for generating a rotating magnetic field.

Another object of the invention is to provide improved apparatus for generating a rotating magnetic field, wherein the direction of rotation may be effected without the aid of external switching equipment.

A still further object of the invention is to provide improved apparatus for generating a rotating magnetic field wherein the out of phase currents used to energize the field coils are derived by the coils themselves.

Briefly, these objectives may be attained by tuning each pair of field coils to resonance at the rotation frequency and critically coupling them together. The relative positions of the coils is adjusted to provide magnetic coupling and a condenser may be connected between the coils so as to provide capacitative coupling. The resultant critical coupling can be made either capacitative or inductive by varying either the physical position of the coils or the value of the coupling capacitor. A change from capacitative to inductive critical coupling or vice versa, reverses the direction of rotation of the magnetic field established by the coils. By choosing the proper inductive coupling between the coils both critical coupling settings may be made to occur within the tuning range of the coupling capacitor. No external phase shifter is required as the critical coupling causes the currents in the two field coils to have the desired phase difference of 90°.

The manner in which the above objectives can be attained will be clearer after a consideration of the drawings in which:

Figures 1 and 1A illustrate a type of color kinescope with which this invention may be used.

Figure 2 is a schematic illustration of the apparatus for producing a rotating magnetic field in accordance with the present invention; and Figures 3 and 4 are vector diagrams used in explaining the operation of the invention.

Referring to the drawings, Figure 1 shows a previously developed cathode ray tube of a type to be used in the invented combination. The tube consists of an evacuated envelope 10, having both a conical portion 12 and a tubular neck portion 14 coaxially joined together as shown. The conical portion 12 of the envelope is closed by a face plate 16 and closely spaced from it is a fluorescent target and screen structure 18 to be described below. Mounted coaxially within the tubular envelope portion 14 is an electron gun structure for producing and focusing a beam of electrons 20 on the screen structure 18. The electron gun is of conventional design and consists of a cathode cylinder 22 closed, as is shown, at the end facing the target screen 18.

A control grid cylinder 24 coaxially surrounds the electron emitting end of the cathode 22 and has an apertured plate structure closing one end thereof and closely spaced from the cathode. A shield electrode or grid 26 constitutes a short thimble-like electrode having an aperture in the bottom thereof for the passage of electrons therethrough. Spaced along the tubular neck portion 14 and coaxial with the other electron gun parts is a tubular first anode electrode 28, having an enlarged portion at the end facing the fluorescent screen 18. A second anode electrode is formed by a conductive coating 31 on the inner surface of the tubular envelope portion 14 and extends into the conical envelope portion 12 to a point adjacent the fluorescent screen 18. The several electrodes described, which constitute the electron gun structure of the tube may be connected to a source of direct current potential which may be a voltage divider connected between the positive and negative points of a direct current potential source.

The electrostatic fields produced respectively between electrodes 26 and 28, and 28 and 31, are of a converging nature and cause the electrons to form into a beam having a minimum cross section or cross-over point 56 between the tubular electrode 28 and the screen 18. The electron beam, after passing through this cross-over point 56, tends to diverge before striking the screen 18. The diverged beam is bent away from the central axis of the tube by a rotating radial magnetic field. As is well known in the art, such a field can be generated by applying current of one phase to a first pair of coils that are diametrically mounted about the neck of the tube and applying current of a different phase to a second pair of coils that are mounted with their axis at 90° to the first pair. For simplicity, the coils are shown as one yoke 60. The focusing coil 34 serves to converge the electrons within the beam and also to direct the beam to the same point on a mask 44 that the beam would have struck if the yoke 60 were not used. Thus the beam substantially generates a cone of revolution having an apex at the mask 44.

The electron beam 20 and hence the apex of the cone of revolution may be caused to scan over the surface of the mask 44 in any desired pattern or raster. However, in tubes of this type, the conventional scanning consists of parallel lines from top to the bottom of the screen 18. The scanning of the beam is produced by scanning fields established by two pairs of scanning coils included in the yoke 40. Each pair of coils is connected to well known circuits producing saw-tooth currents that cause the beam to scan vertically and horizontally.

In the screen structure 18, the masking electrode 44 is positioned in front of a transparent phosphor supporting sheet 46. The masking electrode 44 is formed from thin metallic foil which is opaque to the electrons of the beam 20. A plurality of apertures 48 are formed through the metal foil of the masking electrode 44. Supported on the surface of transparent plate 46 are areas 50 of phosphor coating which are positioned in the path of the beam 20 passing through apertures 48.

In the enlarged section of the screen 18 shown in Figure 1A it can be seen that if the electron beam approached the target from any one of the directions indicated as X, Y, or Z, the electrons of the beam will pass through the apertures of the masking electrode 44 and strike those phosphor spots which are in line with the beam path coincident with these directions. When the beam approaches the target along a path "X" it strikes only those phosphor coated spots indicated by "R," which luminesce with a red light. In a similar manner, when the beam approaches the target along path "Y," it strikes only those areas indicated by the letters "G" which luminesce with a green light. If the tube is a three color tube, the electrons of the beam approaching the target along the path "Z" will strike those phosphor areas indicated by the letter "B," which luminesce with a blue light.

Thus, the combined effects of the rotating field of coils of the yoke 60 and that of the focusing coil 34 results in beam 20 being first displaced from its normal path and then redirected along a new path to strike the surface of target 18 from sequentially different directions and accordingly strikes the phosphor spots in sequence.

As shown in Figure 2, a source of energy 62 having the same frequency as the desired frequency of rotation of the magnetic field is coupled to the ungrounded ends of a first set of parallel field coils 66 and 68 that are mounted opposite each other in such manner that their magnetic fields are aiding. A variable condenser 70 is adjusted so as to tune the parallel field coils 66 and 68 to resonance. The ungrounded ends of the field coils 66 and 68 are coupled via a variable condenser 72 to the ungrounded ends of another set of parallel field coils 74 and 76 that are mounted opposite each other with magnetic fields aiding and in a direction that is at an angle, with respect to the magnetic field set up by the fields coils 66 and 68. For most purposes, the angle between the magnetic fields established by the different pairs of coils is substantially 90°. A variable condenser 78 is connected in parallel with the field coils 74 and 76 so as to tune them at or near resonance.

The following procedure may be used in adjusting the apparatus for operation. The condenser 70 is adjusted so as to resonate the first set of field coils 66 and 68 at the beam rotational frequency supplied by the source 62, and the condenser 78 is adjusted so as to resonate the second set of field coils 74 and 76 at the same frequency. The condenser 70 acts as an amplitude control because the voltage across the coils 66 and 68 and hence the current through them varies as the condenser 70 is tuned. The relative magnitudes of the primary and secondary currents is a function of the coupling, being equal for a critical setting. The relative phase of the two currents is a function of the tuning of the secondary, being 90° for secondary resonance. The variable coupling condenser 72 is set at its midvalue and the magnetic coupling between the first and second sets of field coils is varied by changing the angle between their axes until there is no effective coupling between them. The magnetic coupling can be represented by the dotted inductance 80. No effective coupling exists when the magnetic coupling is such that the coupling inductance 80 and the coupling condenser 72 are in parallel resonance at the frequency of the field rotation. At parallel resonance, the parallel combination of the condenser 72 and the inductance 80 has an extremely high impedance so as to effectively prevent any energy from reaching the second set of field coils 74 and 76.

It should be realized that the inductance 80 is not physically present but is the equivalent of the actual mutual inductance between the coils.

One direction of rotation of the resultant magnetic field produced by the combined action of the two sets of field coils is produced if the capacitance of the variable condenser 72 is reduced so that the current in the second set of field coils 74 and 76 lags the current flowing in the first set of field windings 66 and 68. The other direction of rotation of the resultant magnetic field is effected if the capacitance of the condenser is increased so that the current flowing in the second set of coils 74 and 76 leads the current flowing in the first set of field coils 66 and 68.

These values of capacitance are selected so as to produce inductive critical coupling when the capacitance is reduced and capacitative critical coupling when the capacitance is increased. If the currents in the two sets of field coils are not 90° out of phase, the rotating magnetic field is elliptical. The axis of this ellipse is changed by the condenser 78 and it therefore could be a tilt control.

The phase relationship between the voltages across each set of field coils and the currents flowing in the field coils can best be illustrated by the vector diagrams of Figures 3 and 4. $E_1$ designates the voltage across the first set of field coils 66 and 68. The current $I_1$ flowing through these coils lags the voltage $E_1$ by 90°. Now if the capacitance of the condenser 72 is small, its impedance is high and the current flowing toward the second set of field coils lags the voltage $E_1$ by 90°. Because the second set of field coils are tuned to resonance by the condenser 78, the parallel combination appears as a resistance so that the voltage $E_2$ across it is in phase with the total current flowing through it and consequently $E_2$ lags the voltage $E_1$ by 90°. The current $I_2$ flowing in the coils 74 and 76, however, lags the voltage $E_2$ that is across them by 90°, and therefore lags the current $I_1$ by 90°. This is the phase relationship for inductive coupling.

If the capacitance of the condenser 72 is increased, the current flowing to the second set of field coils leads the voltage $E_1$ by 90° and therefore the voltage $E_2$ leads the voltage $E_1$ by 90° as shown in Figure 3. The current $I_2$ actually flowing in the coils 74 and 76 however lags $E_2$ by 90° and is therefore 90° ahead of the current $I_1$ so that the coils are capacitatively coupled together.

If it were not desired to reverse the direction of rotation of the magnetic field, the condenser 72 could be open circuited and critical magnetic coupling could be achieved by rotating the coils, or the coils could be locked in the position of zero magnetic coupling and the capacitor 72 could be adjusted for critical coupling. One important feature of this invention is that the critical coupling of the field coils produces the desired 90° phase relationship between the currents $I_1$ and $I_2$. Another feature of the invention is the introduction of the condenser 72 to permit reversing the relative phases of the field coil currents $I_1$ and $I_2$.

Having thus described the invention, what is claimed is:

1. Apparatus adapted to generate a rotating magnetic field for use in conjunction with a cathode ray tube comprising in combination a first means for continuously establishing a first magnetic field, a second means for continuously establishing a second magnetic field in the same plane as and at an angle to said first magnetic field, said first and second means being respectively tuned for resonance at the field rotating frequency and critically coupled.

2. Apparatus as described in claim 1 wherein a condenser is connected between said first and second means.

3. Apparatus adapted to generate a rotating magnetic field for use in conjunction with cathode ray tubes comprising in combination a first field coil, a condenser connected in parallel with said first field coil, a second field coil, a condenser connected in parallel with said second field coil, said second field coil and said first field coils being mounted so as to produce intersecting magnetic fields in substantially the same plane, said first and second field coils each being tuned to resonate at substantially the same frequency, said field coils being mounted so that there is at least some inductive coupling between them.

4. Apparatus as described in claim 3 wherein an end of each field coil is connected to a point of fixed potential, and wherein a condenser is connected between the opposite ends.

5. Apparatus as described in claim 4 wherein said condenser is variable and wherein inductive coupling effectively neutralizes the capacitive coupling provided by said condenser when the latter has an intermediate value, one extreme value of capacitance of said condenser being such as to afford critical inductive coupling between the field coils, and the other extreme value of capacitance of said condenser being such as to afford critical capacitive coupling between the field coils.

6. Apparatus to generate a rotating magnetic field at a predetermined frequency comprising, two field coils mounted relative to one another and energizable to produce respectively intersecting magnetic fields in substantially the same region, said field coils being respectively tuned for resonance at said field-rotating frequency, means continuously energizing one of said field coils at said field-rotating frequency, and means critically coupling said two field coils to continuously energize the second of said field coils at said field-rotating frequency.

VERNON D. LANDON.

References Cited in the file of this patent
UNITED STATES PATENTS

| Number | Name | Date |
| --- | --- | --- |
| 2,092,081 | McLennan | Sept. 7, 1937 |
| 2,312,761 | Hershberger | Mar. 2, 1943 |
| 2,449,792 | Snyder, Jr. | Sept. 21, 1948 |